(12) United States Patent
Yan et al.

(10) Patent No.: US 11,518,701 B2
(45) Date of Patent: Dec. 6, 2022

(54) ULTRA-HIGH TEMPERATURE EXCREMENT SOLID-LIQUID SEPARATION EXTRUSION STERILIZATION INTEGRATED MACHINE

(71) Applicant: Wuxi Enbange Machinery Co., Ltd., Jiangsu (CN)

(72) Inventors: Lieping Yan, Jiangsu (CN); Jianyuan Miu, Jiangsu (CN); Weijiang Meng, Jiangsu (CN); Lihua Cai, Jiangsu (CN); Lanji Yan, Jiangsu (CN); Wei Jiang, Jiangsu (CN); Yixuan Wang, Jiangsu (CN); Pingping Zhang, Jiangsu (CN); Weifeng Xie, Jiangsu (CN); Jianwen Zhong, Jiangsu (CN)

(73) Assignee: WUXI ENBANGE MACHINERY CO., LTD., Jiangsu (CN)

( * ) Notice: Subject to any disclaimer, the term of this patent is extended or adjusted under 35 U.S.C. 154(b) by 0 days.

(21) Appl. No.: 17/677,444

(22) Filed: Feb. 22, 2022

(65) Prior Publication Data
US 2022/0204379 A1    Jun. 30, 2022

Related U.S. Application Data

(63) Continuation of application No. PCT/CN2021/143560, filed on Dec. 31, 2021.

(30) Foreign Application Priority Data

Nov. 5, 2021 (CN) .......................... 202111305588.8

(51) Int. Cl.
*C02F 11/125* (2019.01)
*C02F 11/13* (2019.01)
*C02F 103/20* (2006.01)

(52) U.S. Cl.
CPC ............ *C02F 11/125* (2013.01); *C02F 11/13* (2019.01); *C02F 2103/20* (2013.01);
(Continued)

(58) Field of Classification Search
CPC .... C02F 11/125; C02F 11/13; C02F 2103/20; C02F 2201/005; C02F 2301/063; C02F 2303/04
See application file for complete search history.

(56) References Cited

U.S. PATENT DOCUMENTS

2013/0283870 A1    10/2013  Abramov et al.

FOREIGN PATENT DOCUMENTS

| CN | 206783503 U | 12/2017 |
|---|---|---|
| CN | 207942720 U | 10/2018 |

(Continued)

OTHER PUBLICATIONS

CN 110092556—Shen—Comprehensive treatment device for bird feces (Abstract & MT; Aug. 6, 2019) (Year: 2019).*

(Continued)

*Primary Examiner* — Hayden Brewster
(74) *Attorney, Agent, or Firm* — Cooper Legal Group, LLC

(57) ABSTRACT

The present application relates to a field of excrement treatment equipment in particular, relates to an ultra-high temperature excrement solid-liquid separation extrusion sterilization integrated machine. It includes a solid-liquid separator, a workbench and an extrusion sterilization device. The solid-liquid separator is disposed on the workbench. The extrusion sterilization device includes an extrusion sterilization motor, an extrusion feeding assembly, a receiving pipe, a receiving box and a dehydrating cage.

10 Claims, 10 Drawing Sheets

(52) U.S. Cl.
CPC .. *C02F 2201/005* (2013.01); *C02F 2301/063* (2013.01); *C02F 2303/04* (2013.01)

(56) References Cited

FOREIGN PATENT DOCUMENTS

| | | |
|---|---|---|
| CN | 208732886 U | 4/2019 |
| CN | 110341229 A | 10/2019 |
| CN | 210525894 U | 5/2020 |
| CN | 211334725 U | 8/2020 |
| CN | 113830991 A | 12/2021 |
| JP | S5954499 A | 3/1984 |
| JP | 2001340998 A | 12/2001 |
| JP | 2006198540 A | 8/2006 |
| JP | 2016107227 A | 6/2016 |
| WO | 2015128161 A1 | 9/2015 |

OTHER PUBLICATIONS

CN209124593 Yu et al.—Comprehensive Utilization Equipment for Processing Kitchen Waste (Abstract & MT; Jul. 19, 2019) (Year: 2019).*

* cited by examiner

A—A

ULTRA-HIGH TEMPERATURE EXCREMENT SOLID-LIQUID SEPARATION EXTRUSION STERILIZATION INTEGRATED MACHINE

CROSS-REFERENCE TO RELATED APPLICATION

This application is a continuation of PCT application serial no. PCT/CN2021/143560, filed on Dec. 31, 2021, which claims the priority and benefit of Chinese patent application serial no. 202111305588.8, filed on Nov. 5, 2021. The entirety of PCT application serial no. PCT/CN2021/143560 and Chinese patent application serial no. 202111305588.8 are hereby incorporated by reference herein and made a part of this specification.

TECHNICAL FIELD

The present application relates to a field of excrement treatment equipment, in particular, relates to an ultra-high temperature excrement solid-liquid separation extrusion sterilization integrated machine.

BACKGROUND ART

At present, farms for agriculture, animal husbandry, livestock and poultry provide people with a larger amount of livestock and poultry meat. At the same time, a lot of excrement is produced during the process of livestock and poultry breeding. The excrement smells bad and seriously pollutes the environment.

With the improvement of people's living standards, people pay more attention to environment hygiene. In order to improve environment hygiene and protect the environment, a variety of equipment for treating excrement have emerged in the market. Among them, the solid-liquid separator is the main equipment for treating excrement, which can separate the feces from the sewage.

Although the solid-liquid separator can separate the feces and the sewage of the excrement, the separated feces are with high content of water. If the feces are directly placed at one place, the feces may still pollute the environment, which plays only a small role in environment protection.

SUMMARY

In order to reduce the water content in the treated feces to reduce the environment pollution, the present application provides an ultra-high temperature excrement solid-liquid separation extrusion sterilization integrated machine.

The ultra-high temperature excrement solid-liquid separation extrusion sterilization integrated machine provided in the present application adopts the following technical solution:
an ultra-high temperature excrement solid-liquid separation extrusion sterilization integrated machine includes a solid-liquid separator and an extrusion sterilization device; the extrusion sterilization device includes an extrusion sterilization motor, an extrusion feeding assembly, a receiving pipe, a receiving box and a dehydrating cage; a feed inlet is provided on one end of the receiving box, a feed outlet is provided on the other end, the dehydrating cage is disposed inside the receiving box, a diversion pipe is provided in the receiving box, one end of the receiving pipe is connected to the receiving box and is communicated with the feed inlet of the receiving box, and an outlet for solids of the solid-liquid separator is communicated with the receiving pipe; the extrusion feeding assembly includes an extruding shaft, a first conveying spiral blade, a spiral extruding blade, a spiral feeding plate and an extruding head;
the extruding shaft penetrates the receiving pipe, the receiving box and the dehydrating cage through the feed inlet and feed outlet of the receiving box, the outer diameter of the extruding shaft is gradually increased, an end of the extruding shaft with a smaller outer diameter is rotatably connected to an end of the receiving pipe away from the receiving box, an end of the extruding shaft with a larger outer diameter penetrates the feed outlet of the receiving box, and the extrusion sterilization motor is in a transmission connection with the extruding shaft;
the first conveying spiral blade, the spiral extruding blade, and the spiral feeding blade are distributed on the extruding shaft along the length direction of the extruding shaft successively, the first conveying spiral blade is positioned inside the receiving pipe, an end of the first conveying spiral blade abuts to an end of the spiral extruding blade, the spiral feeding plate is disposed close to the feed outlet of the receiving box relative to the first conveying spiral blade, and a spiral angle of the spiral feeding blade is larger than a spiral angle of the spiral extruding blade;
the extruding head is connected on the extruding shaft and is positioned inside the feed outlet of the receiving box, an outlet channel is formed between the extruding head and the feed outlet of the receiving box, and the outlet channel inclines towards the direction departing from a centerline of the extruding shaft.

In some embodiments, an excrement collection structure is also included, the excrement collection structure includes an excrement tank and a collection pipe, the collection pipe is disposed in the excrement tank, an outlet for liquids of the diversion pipe is connected to the collection pipe, an outlet for liquids of the solid-liquid separator is connected to a guide pipe, an outlet for liquids of the guide pipe is connected to the collection pipe.

In some embodiments, a vacuum pump and a pulse negative pressure mechanism are also included, the pulse negative pressure mechanism includes a first exhaust pipe, a first storage tank, a first pulse pipe, and a first pulse valve; a chute and a sealing housing are provided in the workbench; an opening of the sealing housing is communicated with the chute, and the sealing housing is communicated with the feed outlet of the receiving box; one end of the first exhaust pipe is connected to the vacuum pump, and the other end is connected to the first storage tank; a first solenoid valve is provided in the first exhaust pipe; one end of the first pulse pipe is connected to the first storage tank, and the other end is connected to the sealing housing and extends into the internal of the sealing housing; and the first pulse valve is disposed in the first pulse pipe.

In some embodiments, a dry material treatment device is also included; the dry material treatment device includes a feed draught fan, a feeding pipe and a conveying pipe; an air outlet of the feed draught fan is connected to the feeding pipe, an end of the sidewall of the feeding pipe close to the feed draught fan is connected to the conveying pipe, an end of the conveying pipe away from the feeding pipe is communicated with the chute.

In some embodiments, a cut is provided in a portion of the spiral extruding blade close to the spiral feeding blade, a sidewall of the cut is disposed slantly, the slant direction is consistent with the spiral direction of the spiral extruding blade.

In some embodiments, a pumping device is provided in the solid-liquid separator, the pumping device includes a pumping pipe, a sewage pump, an overflow pipe and a buffer box, the buffer box is disposed in the solid-liquid separator and is communicated with the feed inlet of the solid-liquid separator, the pumping pipe is disposed in the buffer box, the sewage pump is disposed in the pumping pipe, the overflow pipe is disposed on an end of the pumping pipe close to the buffer box, and an end of the overflow pipe away from the pumping pipe is connected to the collection pipe.

In some embodiments, a liquid level meter is provided on an end of the inner wall of the buffer box close to the pumping pipe, the liquid level meter is electrically connected to the sewage pump.

In some embodiments, a pulse anti-blockage mechanism is provided in a solid-liquid separation housing, the pulse anti-blockage mechanism includes a second exhaust pipe, a second storage tank, a second pulse pipe and a second pulse valve; one end of the second exhaust pipe is connected to the vacuum pump, and the other end is connected to the second storage tank; a second solenoid valve is provided in the second exhaust pipe, one end of the second pulse pipe is connected to the second storage tank, and the other end is connected to the solid-liquid separation housing and extends to the internal of the solid-liquid separation housing; an end of the second pulse valve extending into the solid-liquid separation housing is positioned outside the filtering cage, and the second pulse valve is disposed in the second pulse pipe.

In some embodiments, a pressing feeder machine is provided between the solid-liquid separator and the extrusion sterilization device; the pressing feeder machine includes a pressing feeder box, a pressing feeder motor and a pressing feeder spiral assembly; an outlet end of the pressing feeder box is connected to the receiving pipe, an outlet for solids of the solid-liquid separator is connected to the pressing feeder box, the pressing feeder spiral assembly is disposed inside the pressing feeder box, the pressing feeder motor is disposed in the pressing feeder box and is in a drive connection with the pressing feeder spiral assembly.

In some embodiments, an opposite type sensor is provided on an end of the internal sidewall of the pressing feeder box close to the solid-liquid separator, the opposite type sensor is electrically connected to the solid-liquid separation motor of the solid-liquid separator.

In conclusion, the present application has at least one of the following beneficial effect.

1. The solid-liquid separator separates the feces and the sewage of the excrement, the sewage is drained to a designated position through the outlet for liquids of the solid-liquid separator, the feces with water enter the receiving pipe through the outlet for solids of the solid-liquid separator. The extrusion sterilization motor drives the extruding shaft, the first conveying spiral blade, the spiral extruding blade, the spiral feeding plate and the extruding head to rotate during operation. The first conveying spiral blade transfers the feces with water towards the receiving box. When the feces with water is transferred to the spiral extruding blade, the spiral extruding blade transfers the feces towards the spiral feeding blade. At the same time, the feces can be extruded by the spiral extruding blade, so that most water in the feces can be drained to the diversion pipe finally through the dehydrating cage. The spiral extruding blade transfers the feces to the spiral feeding plate. The spiral feeding plate transfers the feces towards the extruding head and the material is extruded and cut. The feces between the extruding head and the spiral feeding plate are extruded and heated, so as to realize the sterilization of the feces. The residual water in the feces are evaporated, so that the feces become dry. With the rotation of the extruding shaft, the dried feces are transferred into the outlet channel, and is delivered out of the outlet channel. The feces are dried at this time, and it is sterilized under high temperature and high pressure, which kills the germs, so as to play an increased role in environment protection, which is conducive to environmental protection and can promote the recycling of the feces.

2. After the dried feces are delivered out, the dried feces enter the sealing housing, the first solenoid valve is opened at this time, the vacuum pump pumps the air from the sealing housing through the first pumping pipe, the first storage tank and the first pulse pipe. Under the action of the first pulse valve, the pumping action is in a pulse type. Under the action of the vacuum pump and the pulse negative pressure mechanism, a negative pressure zone is formed in the sealing housing. The dried feces in the sealing housing are boiled at this time, which is dehumidified, so as to increase the dryness degree of the feces.

3. When treating the dry material, the outlet of the feeding pipe is positioned at the designated position for treating the feces and the feed draught fan is started. The dried material is transferred into the receiving pipe through the chute and the conveying pipe. The dried feces are moved under the action of the feed draught fan, so that it is delivered out from the outlet of the feeding pipe and the dried feces are transferred to the designated position automatically, which facilitates the dried feces treatment for operator.

DETAILED DESCRIPTION

The embodiments of the present application provide an ultra-high temperature excrement solid-liquid separation extrusion sterilization integrated machine.

Embodiment 1

Figure 1:
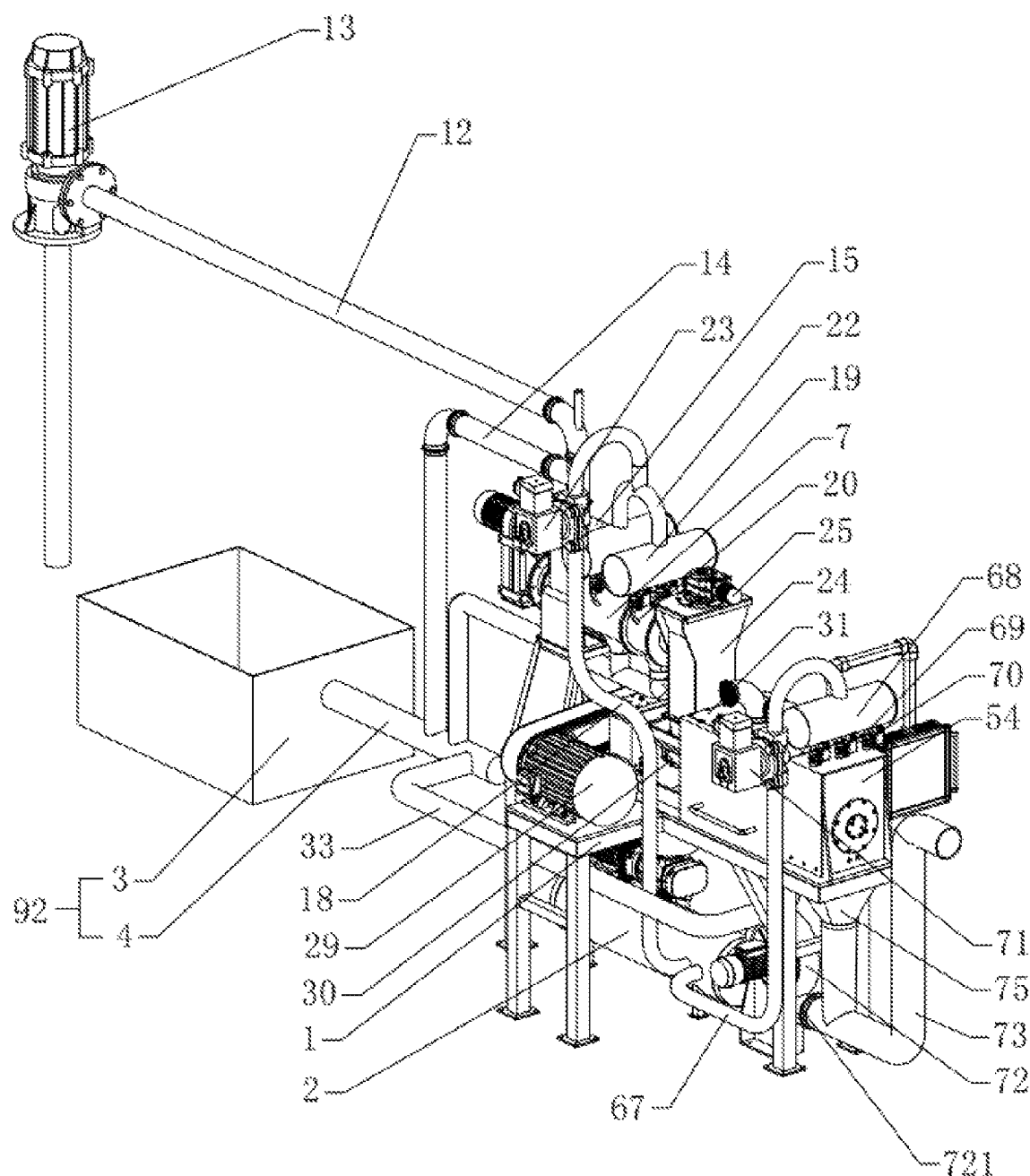
FIG. 1 is a structural diagram for indicating an ultra-high temperature excrement solid-liquid separation extrusion sterilization integrated machine according to Embodiment 1 in the present application.

Referring to FIG. 1, an ultra-high temperature excrement solid-liquid separation extrusion sterilization integrated machine includes a workbench 1, a solid-liquid separator, a pressing feeder machine, an extrusion sterilization device, a vacuum pump 2, a dry material treatment device and an excrement collection structure 92. The solid-liquid separator, the pressing feeder machine and the extrusion sterilization device are disposed on the workbench 1 successively, and the pressing feeder machine is disposed between the solid-liquid separator and the extrusion sterilization device.

Figure 2:
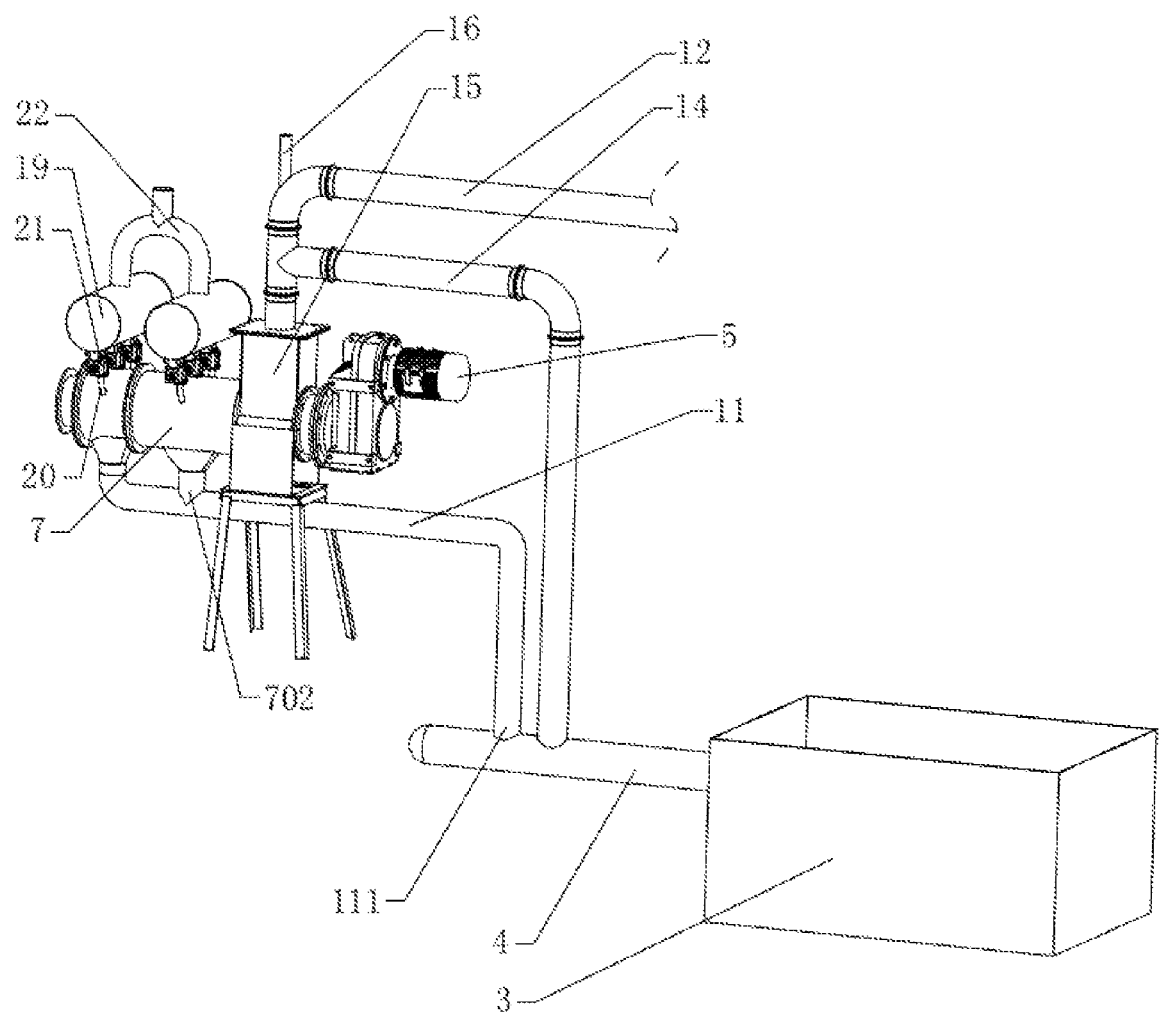
FIG. 2 is a structural diagram for indicating an excrement collection structure according to Embodiment 1 in the present application.

Referring to FIG. 1 and FIG. 2, the excrement collection structure 92 includes an excrement tank 3 and a collection pipe 4, and the collection pipe 4 is disposed on the sidewall of the excrement tank 3.

Figure 3:
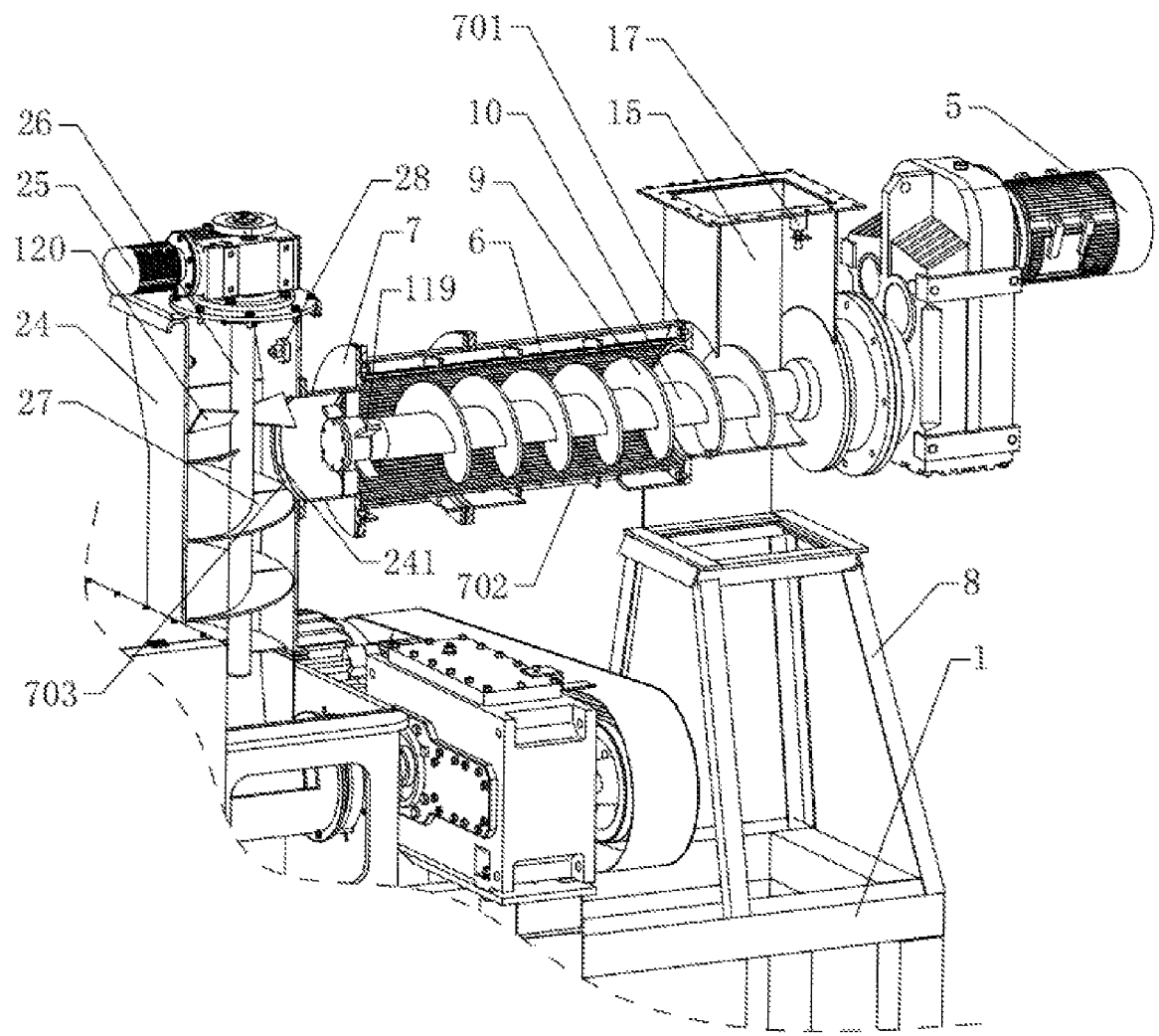
FIG. 3 is a structural diagram for indicating a solid-liquid separator according to Embodiment 1 in the present application.

Referring to FIG. 2 and FIG. 3, the solid-liquid separator includes a solid-liquid separation motor 5, a filtering cage 6, a spiral conveying assembly and a solid-liquid separation housing 7. The solid-liquid separation housing 7 is disposed on the workbench 1 via a separation bracket 8. The separation bracket 8 is connected on the workbench 1. One end of the solid-liquid separation housing 7 is connected to the separation bracket 8. The spiral conveying assembly includes a second conveying spiral blade 9 and a conveying shaft 10. The conveying shaft 10 is rotatably connected in the solid-liquid separation housing 7. A supporting frame 119 is connected inside the solid-liquid separation housing 7. One end of the conveying shaft 10 is rotatably connected to the supporting frame 119, and the other end thereof is rotatably connected with the solid-liquid separation housing and penetrates through the solid-liquid separation housing 7. The second conveying spiral blade 9 is disposed on the conveying shaft 10. The solid-liquid separation motor 5 is disposed in the solid-liquid separation housing 7 and is connected with one end of the conveying shaft 10 penetrating the solid-liquid separation housing 7. The solid-liquid separation motor 5 is a gear motor. The filtering cage 6 is disposed inside the solid-liquid separation housing 7 and outside the second conveying spiral blade 9. The end of the solid-liquid separation housing 7 away from the solid-liquid separation motor 5 is the outlet end 701. The supporting frame 119 is close to the outlet end 701 of the solid-liquid separation housing 7. In addition, the supporting frame 119 forms a hollow structure, which facilitates the transfer of the feces. An outlet for liquids 702 is provided on the side of the solid-liquid separation housing 7 away from the ground. A guide pipe 11 is connected at the outlet for liquids 702 of the solid-liquid separation housing 7. A collection pipe 4 is connected to the end of the guide pipe 11 away from the solid-liquid separation housing 7 (i.e., the outlet for liquids 111 of the guide pipe 11).

Referring to FIG. 1, FIG. 2 and FIG. 3, a pumping device is connected on the solid-liquid separator. The pumping device includes a pumping pipe 12, a sewage pump 13, an overflow pipe 14 and a buffer box 15. A feed inlet 701 is provided on the end of the solid-liquid separation housing 7 close to the solid-liquid separation motor 5. A buffer box 15 is disposed on the solid-liquid separation housing 7 and is communicated with the feed inlet 701 of the solid-liquid separation housing 7. The pumping pipe 12 is disposed on the end of the buffer box 15 away from the solid-liquid separator. A communicating pipe 16 is provided on the end of the pumping pipe 12 close to the buffer box 15. The sewage pump 13 is disposed on the pumping pipe 12. A liquid level meter 17 is provided on the end of the inner wall of the buffer box 15 close to the pumping pipe 12, and the liquid level meter 17 is electrically connected to the sewage pump 13. The overflow pipe 14 is disposed on the end of the pumping pipe 12 close to the buffer box 15, and the end of the overflow pipe 14 away from the pumping pipe is connected to the collection pipe 4.

The sewage pump 13 pumps the excrement to the buffer box 15 through the pumping pipe 12 during operation, and the excrement enters the solid-liquid separation housing 7 through buffer box 15. The solid-liquid separation motor 5 drives the conveying shaft 10 and the second conveying spiral blade 9 to rotate in operation. The second conveying spiral blade 9 transfers the excrement during the rotation, and the water in the excrement flows into the guide pipe 11 through the filtering cage 6 during the transfer, and flows inside the excrement tank 3 through the collection pipe 4, so as to realize the recycling of the water separated from the excrement and avoid the influence on the sanitation due to the indiscriminate discharge of the water in the excrement. The feces are transferred out of the solid-liquid separation housing 7 through the outlet for solids 703 of the solid-liquid separation housing 7.

When the excrement is continuously pumped into the buffer box 15, if the conveying speed of the solid-liquid separator is low, it may lead to the increase of the excrement in the buffer box 15. When the liquid level meter 17 senses the increase of the excrement, the excrement pumping speed of the sewage pump 13 is controlled by the liquid level meter 17, in which the excrement pumping speed of the sewage pump 13 is decreased, so as to reduce the possibility of the excrement overflow, that is, the excrement is pumped into the pumping pipe 12 and overflowed through the overflow pipe 14. When the excrement is overflowed from the overflow pipe 14, the overflowed excrement flows into the excrement tank 3 through the collection pipe 4, so as to realize the recycling of the overflowed excrement, and avoid the influence on the sanitation due to the indiscriminate discharge of the water in the excrement.

Referring to FIG. 1, FIG. 2 and FIG. 3, the vacuum pump 2 is disposed below the workbench 1, so as to save space. A pulse anti-blockage mechanism is provided in a solid-liquid separation housing 7. The pulse anti-blockage mechanism includes a second exhaust pipe 18, a second storage tank 19, a second pulse pipe 20 and a second pulse valve 21. One end of the second exhaust pipe 18 is connected to the vacuum pump 2, and the other end is connected to the second storage tank 19. There are two second storage tanks 19. Two second storage tanks 19 are connected with the second exhaust pipe 18 through a three-way pipe 22. A second solenoid valve 23 is provided in the second exhaust pipe 18, and each second storage tank 19 is connected to three second pulse pipes 20. One end of the second pulse pipe 20 is connected to the second storage tank 19, and the other end is connected to the solid-liquid separation housing 7 and extends to the internal of the solid-liquid separation housing 7. The end of the second pulse valve 21 extending into the solid-liquid separation housing 7 is positioned outside the filtering cage 6, and the second pulse valve 21 is disposed in the second pulse pipe 20.

When the separation of the water and the feces are conducted by the solid-liquid separator, the second solenoid valve 23 is opened. The vacuum pump 2 pumps the air from the solid-liquid separation housing 7 through the second exhaust pipe 18, the second storage tank 19 and the second pulse pipe 20. Under the action of the second pulse valve 21, the pumping action is in a pulse type, and a pulsating suction is generated, so that the possibility of the blockage of the filtering cage 6 caused by the feces of the excrement is reduced, and the filtering cage 6 is not easy to block.

Referring to FIG. 3, the pressing feeder machine is vertically disposed. The pressing feeder machine includes a pressing feeder box 24, a pressing feeder motor 25 and a pressing feeder spiral assembly. The pressing feeder box 24 is vertically disposed on the workbench 1. The end of the pressing feeder box 24 close to the ground is as the outlet end 242, and the end of the sidewall of the pressing feeder box 24 is provided with a feed inlet 241. The outlet for solids 703 of the solid-liquid separation housing 7 is connected to the pressing feeder box 24. The solid-liquid separation housing 7 is communicated with the interior of the pressing feeder box 24 through the feed inlet 241 of the pressing feeder box 24. The pressing feeder motor 25 is disposed on the end of the pressing feeder box 24 away from the ground. The pressing feeder spiral assembly is disposed inside the pressing feeder box 24. The pressing feeder spiral assembly includes a pressing feeder shaft 26, a cutting blade 120 and a pressing feeder spiral blade 27. The pressing feeder shaft 26 is rotatably connected in the pressing feeder box 24. One end of the pressing feeder shaft 26 penetrates through the pressing feeder box 24 and is connected to the pressing feeder motor 25. The pressing feeder spiral blade 27 and the cutting blade 120 are disposed on the pressing feeder shaft 26. The cutting blade 120 is positioned above the pressing feeder spiral blade 27. There are two cutting blades 120, and two cutting blades 120 are positioned on two sides of the pressing feeder shaft 26 respectively. And the planes of two cutting blades 120 are perpendicular to each other. An opposite type sensor 28 is provided in the end of the internal sidewall of the pressing feeder box 24 close to the solid-liquid separator. The opposite type sensor 28 is electrically connected to the solid-liquid separation motor 5.

The solid-liquid separator transports the excrement into the pressing feeder box 24 through the outlet for solids 703 of the solid-liquid separation housing 7. The pressing feeder motor 25 drives the pressing feeder shaft 26 and the pressing feeder spiral blade 27 to rotate during operation. The pressing feeder spiral blade 27 transports and presses the feces during rotation to realize the pressing and feeding of the feces, so that the feces are transported out through the outlet end 242 of the pressing feeder box 24. In the process of the transport of the feces, when too much feces are transported into the pressing feeder box 24 for the pressing feeder machine to transport, the feces in the pressing feeder box 24 is sensed by the opposite type sensor 28, and the opposite type sensor 28 controls the rotating speed of the solid-liquid separation motor 5, so as to reduce the feeding speed of the feces from the solid-liquid separator to the pressing feeder box 24, and avoid too much feces in the pressing feeder box 24.

Figure 4:
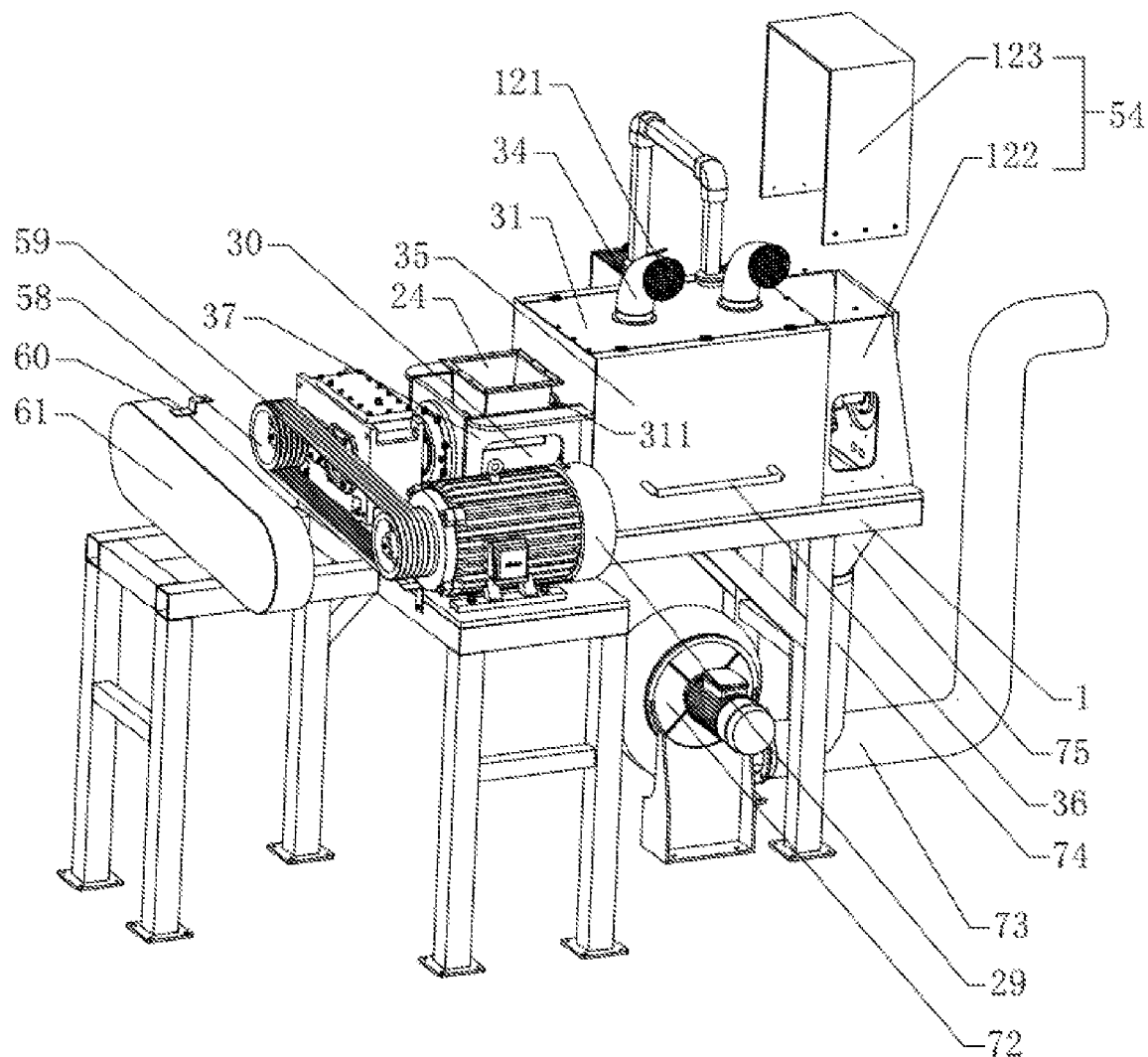
FIG. 4 is a structural diagram for indicating an extrusion sterilization device according to Embodiment 1 in the present application.
Figure 5:
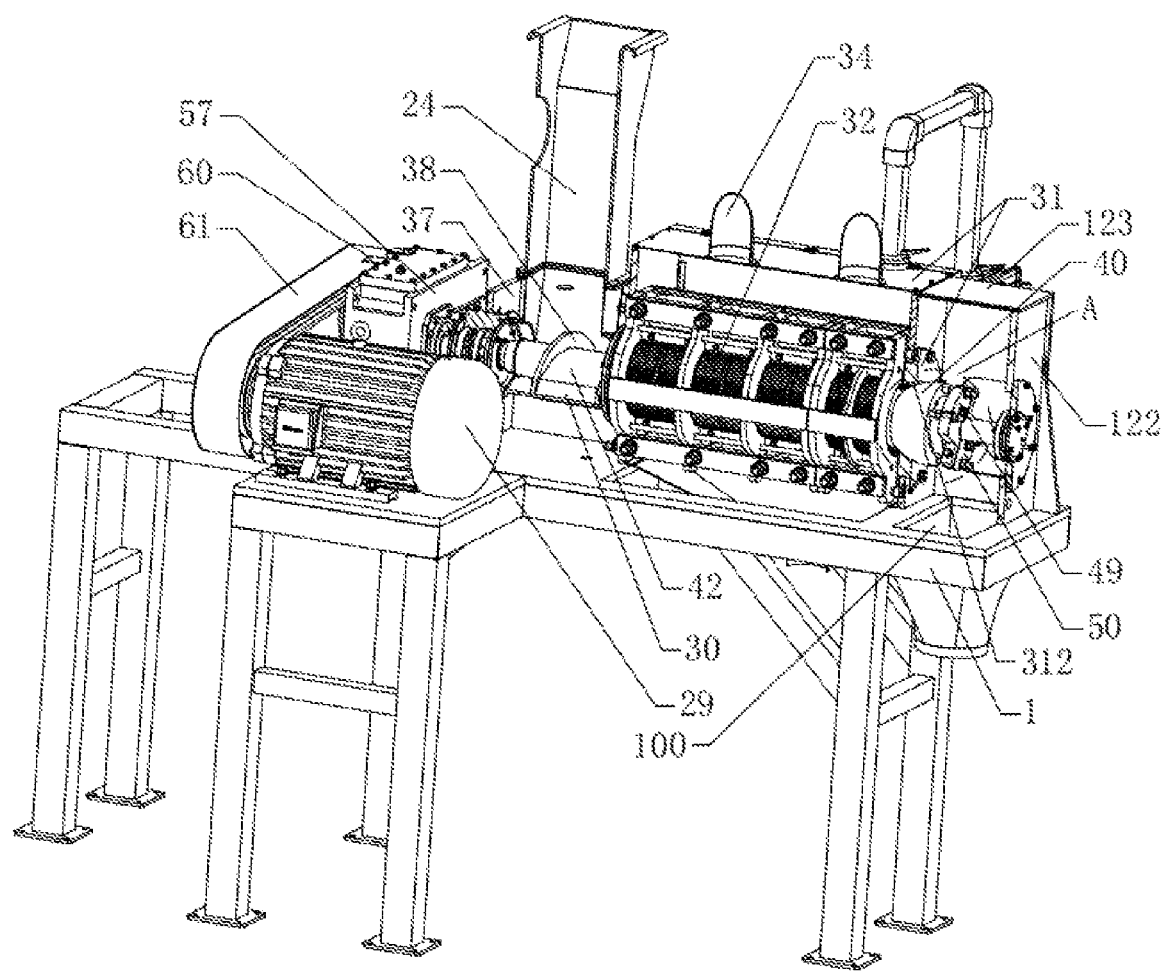
FIG. 5 is a structural diagram for indicating the position relationship between a dehydrating cage and a receiving box according to Embodiment 1 in the present application.

Referring to FIG. 4 and FIG. 5, the extrusion sterilization device includes an extrusion sterilization motor 29, an extrusion feeding assembly, a receiving pipe 30, a receiving box 31 and a dehydrating cage 32.

Referring to FIG. 1, FIG. 4 and FIG. 5, the receiving box 31 is disposed on the workbench 1. A feed inlet 311 is provided on one end of the receiving box 31, and a feed outlet 312 is provided on the other end. The bottom of the receiving box 31 is disposed as a funnel shape. A placing opening is provided on the workbench 1. The bottom of the receiving box 31 penetrates the placing opening. A diversion pipe 33 is connected on the bottom of the receiving box 31. A collection pipe 4 is connected to the end of the diversion pipe 33 away from the receiving box 31. A discharging pipe 34 is provided on the top of the receiving box 31. A filtering net 121 is connected on the end of the discharging pipe 34 away from the receiving box 31. Two opposite sidewalls of the receiving box 31 are each provided with an observation opening. A shielding plate 35 for covering the observation opening is hinged with the receiving box 31. A handle 36 for facilitating turning over the shielding plate 35 is connected to the shielding plate 35. The dehydrating cage 32 is disposed inside the receiving box 31.

Referring to FIG. 4 and FIG. 5, a fixing frame 37 is connected to the workbench 1. One end of the receiving pipe 30 is connected to the receiving box 31 and is communicated with the feed inlet 311 of the receiving box 31, and the other end is connected to the fixing frame 37. The outlet end 242 of the pressing feeder box 24 is connected on the receiving pipe 30.

Figure 6:
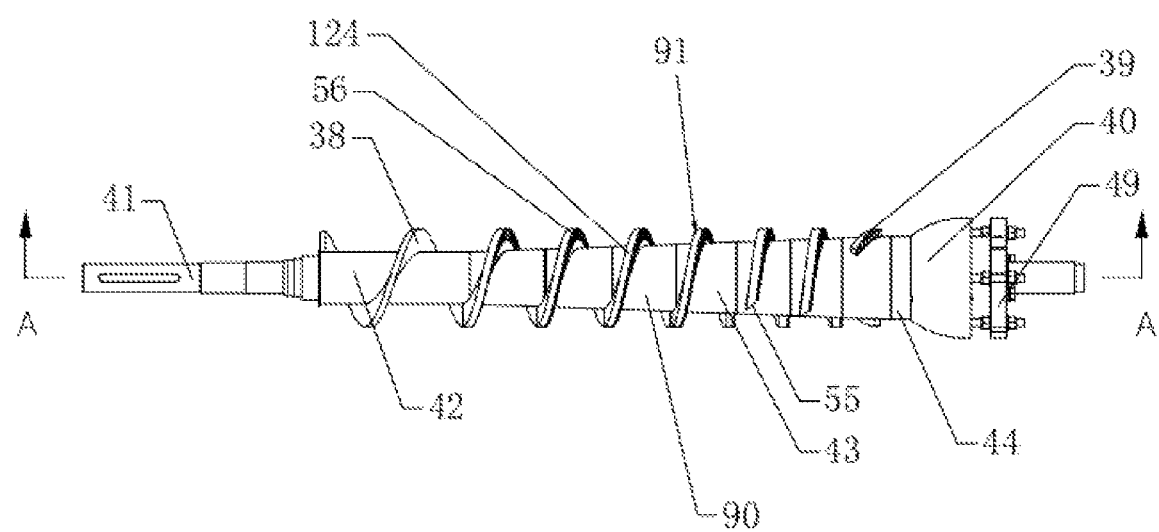
FIG. 6 is a structural diagram for indicating an extruding shaft according to Embodiment 1 in the present application.
Figure 7:
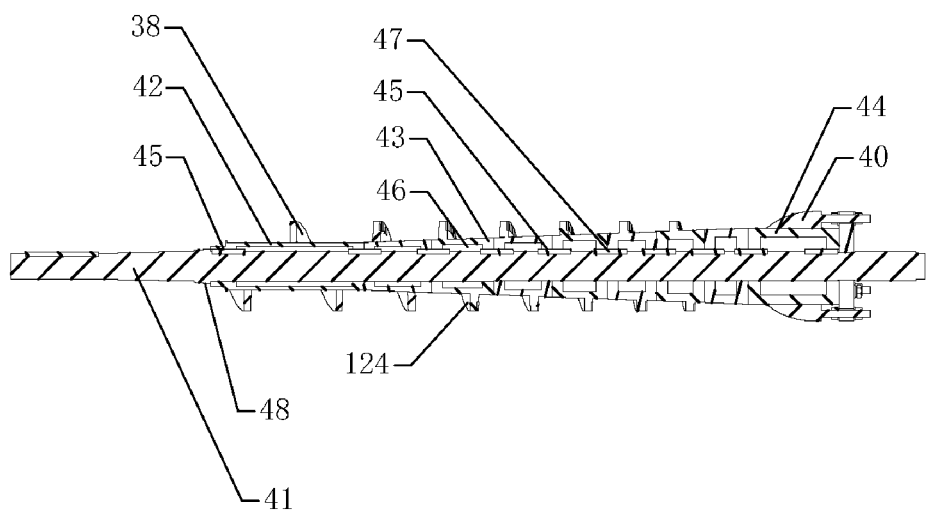
FIG. 7 is an A-A sectional diagram of FIG. 6 according to Embodiment 1 in the present application.

Referring to FIG. 6 and FIG. 7, the extrusion feeding assembly includes an extruding shaft 90, a first conveying spiral blade 38, a spiral extruding blade, a spiral feeding plate 39 and an extruding head 40.

Referring to FIG. 5, FIG. 6 and FIG. 7, the extruding shaft 90 penetrates through the receiving pipe 30, the receiving box 31 and the dehydrating cage 32 through the feed inlet 311 and feed outlet 312 of the receiving box 31. The outer diameter of the extruding shaft 90 is gradually increased. The end of the extruding shaft 90 with a smaller outer diameter is rotatably connected to an end of the receiving pipe 30 away from the receiving box 31, and the end of the extruding shaft 90 with a larger outer diameter penetrates the feed outlet 312 of the receiving box 31 and is rotatably connected to the workbench 1.

Referring to FIG. 6 and FIG. 7, the extruding shaft 90 includes a shaft core 41, a front shaft sleeve 42, a middle shaft sleeve 43 and an end shaft sleeve 44. There are several middle shaft sleeves 43. A clamping groove 45 is provided on each end of the front shaft sleeve 42 internal sidewall, each end of the middle shaft sleeve 43 internal sidewall and each end of the end shaft sleeve 44 internal sidewall. A weight reduction groove 46 is provided on the internal sidewalls of the front shaft sleeve 42, middle shaft sleeve 43 and the end shaft sleeve 44. The clamping groove 45 is communicated with the weight reduction groove 46. The front shaft sleeve 42, the middle shaft sleeve 43 and the end shaft sleeve 44 is disposed on the shaft core 41 along the length direction of the shaft core 41 successively. The shaft core 41 penetrates through the front shaft sleeve 42, the middle shaft sleeve 43 and the end shaft sleeve 44. A clamping key 47 is connected on the shaft core 41. The clamping key 47 is inserted into the clamping groove 45. The outer diameter of the end shaft sleeve 44 is larger than that of the front shaft sleeve 42. The outer diameters of the middle shaft sleeve 43 are gradually increased. The outer diameters of adjacent middle shaft sleeves 43 are linked with each other. The end of the middle shaft sleeve 43 close to the front shaft sleeve 42 with a smaller outer diameter is linked with the outer diameter of the front shaft sleeve 42. The end of the middle shaft sleeve 43 close to the end shaft sleeve 44 with a larger outer diameter is linked with the outer diameter of the end shaft sleeve 44.

Referring to FIG. 5 and FIG. 7, a limiting protrusion 48 is provided on the end of the shaft core 41. The limiting protrusion 48 and the shaft core 41 are integrally formed. The end of the front shaft sleeve 42 away from the middle shaft sleeve 43 abuts against the limiting protrusion 48. The end of the shaft core 41 close to the front shaft sleeve 42 is rotatably connected to the receiving pipe 30 and penetrates through the receiving pipe 30.

Figure 8:
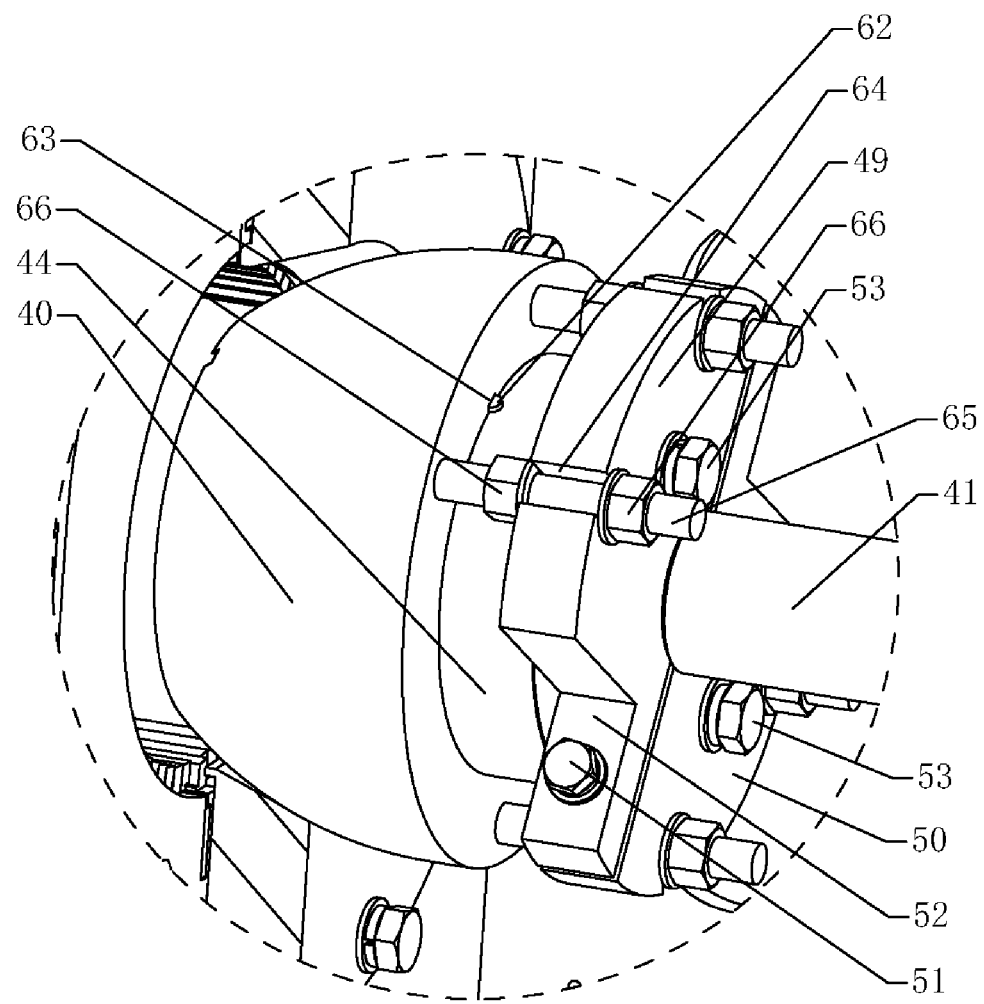
FIG. 8 is an enlarged diagram of Part A in FIG. 5 for indicating the position relationship between an extruding head and an end shaft sleeve.

Referring to FIG. 5, FIG. 7 and FIG. 8, a limiting plate is connected to the end of the shaft core 41 away from the limiting protrusion 48. The limiting plate includes a first limiting plate 49 and a second limiting plate 50. The first limiting plate 49 and the second limiting plate 50 are each provided with an arc groove. The first limiting plate 49 and the second limiting plate 50 are positioned on two sides of the shaft core 41 respectively. The first limiting plate 49 and the second limiting plate 50 are abutted against each other. The end of the first limiting plate 49 is fixed with the end of the second limiting plate 50 through a fixing screw 51. The shaft core 41 is positioned in the arc groove and abuts against the sidewall of the arc groove. The first limiting plate 49 and the second limiting plate 50 are each provided with a fixing groove 52. The nut of the fixing screw 51 is positioned in the fixing groove 52. The first limiting plate 49 and the second limiting plate 50 are both threadedly connected with a pushing screw 53. A pushing hole is provided on the end shaft sleeve 44. One end of the pushing screw 53 is inserted in the pushing hole and abuts against the end shaft sleeve 44.

Referring to FIG. 4 and FIG. 5, the end shaft sleeve 44 penetrates through the feed outlet 312 of the receiving box 31. The limiting plate is positioned outside the receiving box 31. The end of the shaft core 41 close to the end shaft sleeve 44 runs through the feed outlet 312 of the receiving box 31. A sealing housing 54 is connected on the workbench 1. The sealing housing 54 includes a housing body 122 and a housing cover 123. The housing body 122 is disposed on the workbench 1. A repairing opening is provided on the housing body 122. The housing cover 123 is connected to the housing body 122 via the screw and covers the top and the repairing opening of the housing body 122. The sealing housing 54 is communicated with the feed outlet 312 of the receiving box 31. The end of the shaft core 41 running through the feed outlet 312 of the receiving box 31 is rotatably connected in the sealing housing 54. A chute 100 is provided on the workbench 1. The opening of the sealing housing 54 is communicated with the chute 100.

Referring to FIG. 5, FIG. 6 and FIG. 7, the first conveying spiral blade 38, the spiral extruding blade 91 and the spiral feeding plate 39 are disposed on the extruding shaft 90 along the length direction of the extruding shaft 90 successively. The first conveying spiral blade 38 is disposed in the front shaft sleeve 42, and the first conveying spiral blade 38 is positioned inside the receiving pipe 30. The spiral feeding plate 39 is disposed close to the feed outlet 312 of the receiving box 31 relative to the first conveying spiral blade, and the spiral feeding plate 39 is disposed on the middle shaft sleeve 43 close to the end shaft sleeve 44. There are two notches on the spiral feeding plate 39. Two notches are disposed oppositely about the middle shaft sleeve 43. Two notches divide the spiral feeding plate 39 into two sections. The spiral extruding blade 91 includes a plurality of spiral slices 124. The number of the spiral slices 124 is one less than the number of the middle shaft sleeve 43. Each spiral slice 124 is connected on the corresponding middle shaft sleeve 43. The spiral slices 124 abut against each other. The spiral slice 124 close to the first conveying spiral blade 38 abuts against the first conveying spiral blade 38. A cut 55 is provided on two spiral slices 124 close to the spiral feeding plate 39. One sidewall of the cut 55 is slantly disposed, and the slant direction is in the same direction as the spiral direction of the spiral extruding blade 91. The spiral angle of the spiral feeding plate 39 is larger than the spiral angle of the spiral extruding plate. The pitch of screws of the spiral extruding blade 91 is larger than the pitch of screws of the first conveying spiral blade 38. The side of the spiral slice 124 and the side of the spiral feeding plate 39 towards to the feed outlet 312 of the receiving box 31 are both welded with a wear resistant plate 56.

Referring to FIG. 4, FIG. 5 and FIG. 6, the extrusion sterilization motor 29 is disposed on the workbench 1. A reducer 57 is connected on the workbench 1. The reducer 57 and the extrusion sterilization motor 29 are linked through a belt drive mechanism. The belt drive mechanism includes a belt pulley 58 and an annular belt 59. The belt pulleys 58 are connected on the output shaft of the extrusion sterilization motor 29 and the input shaft of the reducer 57 respectively. The annular belt 59 is sleeved on the belt pulley 58 and is tensed by the belt pulleys 58. The output shaft of the reducer 57 is connected to the shaft core 41. A protection cover 61 is connected to the reducer 57 through a connecting plate 60. The belt drive mechanism is positioned inside the protection cover 61.

Referring to FIG. 5 and FIG. 8, the extruding head 40 is connected to the end shaft sleeve 44 of the extruding shaft 90, and is positioned inside the feed outlet 312 of the receiving box 31. The sidewall of the feed outlet 312 of the receiving box 31 is inclined away from the extruding head 40. The shape of the extruding head 40 is in a bullet shape. The two ends of the extruding head 40 are designed in a plane. The end of the extruding head 40 with a smaller diameter is facing the interior of the receiving box 31. An output channel is formed between the extruding head 40 and the feed outlet 312. The output channel is inclined away from the centerline of the extruding shaft 90.

Referring to FIG. 8, a guiding block 62 is connected to the end shaft sleeve 44. A guiding groove 63 is provided on the extruding head 40. The extruding head 40 is sleeved on the end shaft sleeve 44. The guiding block 62 is in the guiding groove 63. The extruding head 40 and the end shaft sleeve 44 are in a slidable connection. The edges of the limiting plate are all provided with an adjusting groove 64. The end of the extruding head 40 with a larger outer diameter is connected to an adjusting threaded rod 65. The adjusting threaded rod 65 penetrates the adjusting groove 64. An adjusting nut 66 is connected to the adjusting threaded rod 65. The adjusting nuts 66 are positioned on two sides of the limiting plate respectively and abut against the limiting plate. Before mounting, the user can adjust the relative position between the extruding head 40 and the feed outlet 312 of the receiving box 31 according to the demand. During adjusting, the adjusting nut 66 is screwed, so that the adjusting nut 66 is moved in the direction away from the limiting plate, the extruding head 40 is moved, and the relative position between the extruding head 40 and the feed outlet 312 of the receiving box 31 is changed. After adjusting the position of the extruding head 40, the adjusting nut 66 is screwed again, so that the adjusting nuts 66 abut against two sides of the limiting plate, so as to finishing the position adjustment of the extruding head 40.

After the feces with water enter the pressing feeder box 24, and further enter the receiving pipe 30 through the pressing feeder box 24, the extrusion sterilization motor 29 drives the input shaft of the reducer 57 to rotate through the belt drive mechanism during operation, so that the output shaft of the reducer 57 drives the shaft core 41 to rotate. The shaft core 41 drives the front shaft sleeve 42, the middle shaft sleeve 43 and the end shaft sleeve 44 to rotate through the fit of the clamping key 47 and the clamping groove 45 during rotation, so that the first conveying spiral blade 38, the spiral extruding blade 91 and the spiral feeding plate 39 are rotated. The first conveying spiral blade 38 conveys the feces with water towards the receiving box 31. When the feces with water are transported to the spiral extruding blade 91, the spiral extruding blade 91 transports the feces towards the spiral feeding plate 39. The most of water in the feces is discharged through the dehydrating cage 32 and finally through the diversion pipe 33, and then is recycled in the excrement tank 3 through the collection pipe 4. At the same time, the spiral extruding blade 91 extrudes the feces. When the feces are transported to the cut 55, the movement stops for a moment, and then continues to move. The feces are cut when passing through the inclined sidewall of the cut 55, so as to realize maintaining pressure and cutting the feces. The spiral extruding blade 91 transports the feces to the spiral feeding plate 39, which transports the feces to the extruding head 40 and compresses and cuts the materials. The feces between the extruding head 40 and the spiral feeding plate 39 are extruded and heated to realize the high-temperature and high-pressure sterilization of the feces. The residual water in the feces is evaporated and the feces become dry. With the rotation of the extruding shaft 90, the dried feces are transported to the output channel, enter in the sealing housing 54 through the output channel, and then transported out through the chute 100, in which the transported feces are dry.

Referring to FIG. 1, a pulse negative pressure mechanism is connected in the sealing housing 54. The pulse negative pressure mechanism includes a first exhaust pipe 67, a first storage tank 68, a first pulse pipe 69, and a first pulse valve 70. One end of the first exhaust pipe 67 is connected to the vacuum pump 2, and the other end is connected to the first storage tank 68. A first solenoid valve 71 is provided in the first exhaust pipe 67. There are three first pulse pipes 69. One end of the first pulse pipe 69 is connected to the first storage tank 68, and the other end is connected to the top of the sealing housing 54 and extends into the internal of the sealing housing 54. The first pulse valve 70 is disposed in the first pulse pipe 69 and positioned outside the sealing housing 54.

When the dried feces enter the sealing housing 54, the first solenoid valve 71 is opened. The vacuum pump 2 pumps the air from the sealing housing 54 through the first exhaust pipe 67, the first storage tank 68 and the first pulse pipe 69. Under the action of the first pulse valve 70, the pumping action is in a pulse type. Under the action of the vacuum pump 2 and the pulse negative pressure mechanism, a negative pressure zone is formed in the sealing housing 54. The dried feces in the sealing housing are boiled at this time, which is dehumidified, so as to increase the dryness degree of the feces.

Referring to FIG. 1 and FIG. 4, the dry material treatment device includes a feed draught fan 72, a feeding pipe 73 and a conveying pipe 74. An air outlet 721 of the feed draught fan 72 is connected to the feeding pipe 73. An end of the sidewall of the feeding pipe 73 close to the feed draught fan 72 is connected to the conveying pipe 74, an end of the conveying pipe 74 away from the feeding pipe 73 is connected to the workbench 1 through hopper 75 and are communicated with the hopper 75. The hopper 75 is connected to the workbench 1 and is positioned under the chute 100. The conveying pipe 74 is connected to the hopper 75.

The dried feces enter the hopper 75 through the chute 100, and then enter the feeding pipe 73 through the conveying pipe 74. The feed draught fan 72 blows the dried feces in the feeding pipe 73 during operation, and the feces are delivered out of the outlet through the feeding pipe 73, and transported to the designed position automatically.

The implement principle of Embodiment 1 is: the sewage pump 13 pumps the excrement from the excrement storage position to the buffer box 15 through the pumping pipe 12, and then the excrement enters the solid-liquid separator through the buffer box 15. The solid-liquid separator conveys the excrement during operation. During conveying, the water in the excrement flows into the guide pipe 11 through the filtering cage 6, and then flows into the excrement tank 3 through the collection pipe 4. The feces in the excrement are delivered into the pressing feeder box 24 through the outlet for solids 703 of the solid-liquid separation housing 7.

The pressing feeder machine delivers the feces in the pressing feeder box 24 into the receiving pipe 30 during operation. The extrusion sterilization motor 29 drives the first conveying spiral blade 38, the spiral extruding blade 91 and the spiral feeding plate 39 to rotate during operation. The first conveying spiral blade 38 delivers the feces with water towards the receiving box 31. When the feces with water are transported to the spiral extruding blade 91, the spiral extruding blade 91 transports the feces towards the spiral feeding plate 39. The most of water in the feces is discharged through the dehydrating cage 32 and finally through the diversion pipe 33, and then is recycled in the excrement tank 3 through the collection pipe 4. At the same time, the spiral extruding blade 91 extrudes and cuts the feces, so as to realize maintaining pressure and cutting the feces. The spiral extruding blade 91 transports the feces to the spiral feeding plate 39, which transports the feces to the extruding head 40 and compresses and cuts the materials. The feces between the extruding head 40 and the spiral feeding plate 39 are extruded and heated to realize the high-temperature and high-pressure sterilization of the feces. The residual water in the feces is evaporated and the feces become dry. With the rotation of the extruding shaft 90, the dried feces are transported to the output channel, and enter the sealing housing 54 through the output channel. With the cooperation of the pulse negative pressure mechanism and the vacuum pump 2, a negative pressure zone is formed in the sealing housing 54. The dried feces are boiled at this time, further to increase the dryness degree of the feces.

The dried feces enter the feeding pipe 73 through the chute 100. Under the action of the feed draught fan 72, the dried feces in the feeding pipe 73 is blown and finally is delivered out from the outlet of the feeding pipe 73. At this time, the dried feces are sterilized under high temperature and high pressure, which increases the role of environmental protection and contributes to environmental protection.

In conclusion, Embodiment 1 in the present application adopts a physical extrusion mode to realize the solid-liquid separation of the feces, and realizes the dehydration and the sterilization of the feces with water under the cooperation of the extruding shaft 90 and the dehydrating cage 32, in which no chemicals are added and no heating devices are used throughout the process. The feces are boiled again by using the vacuum negative pressure to realize the moisture control, so as to realize the purpose of green environment protection.

Embodiment 2

Figure 9:
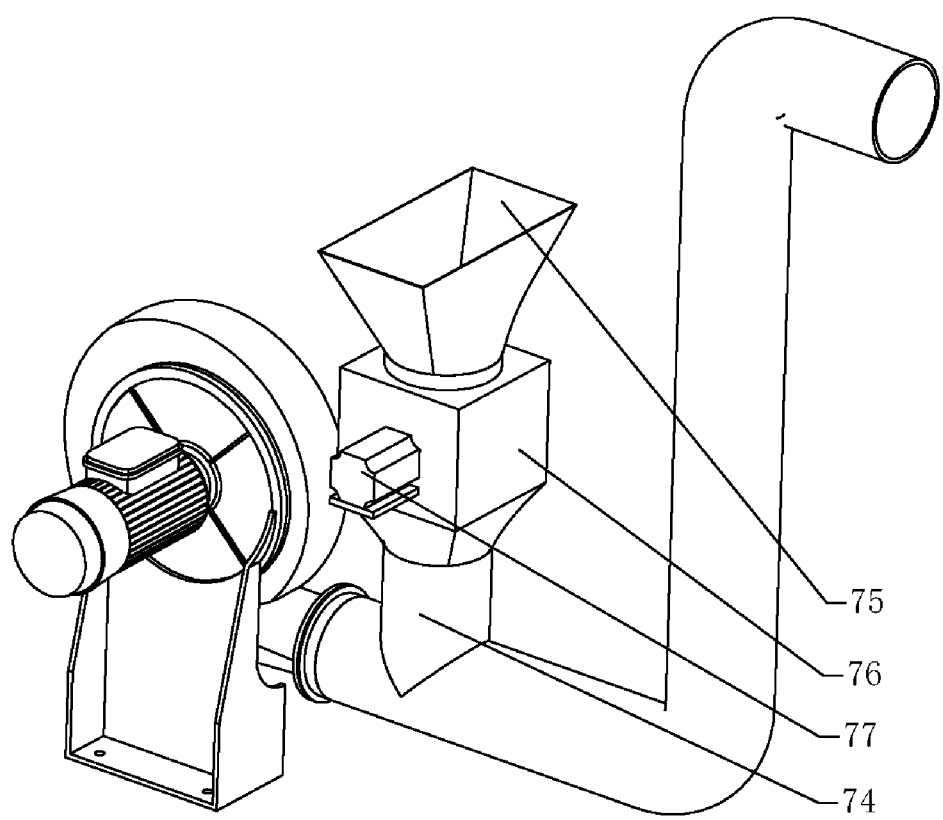
FIG. 9 is a structural diagram for indicating the position relationship between a hopper and a cutting device according to Embodiment 2.
Figure 10:
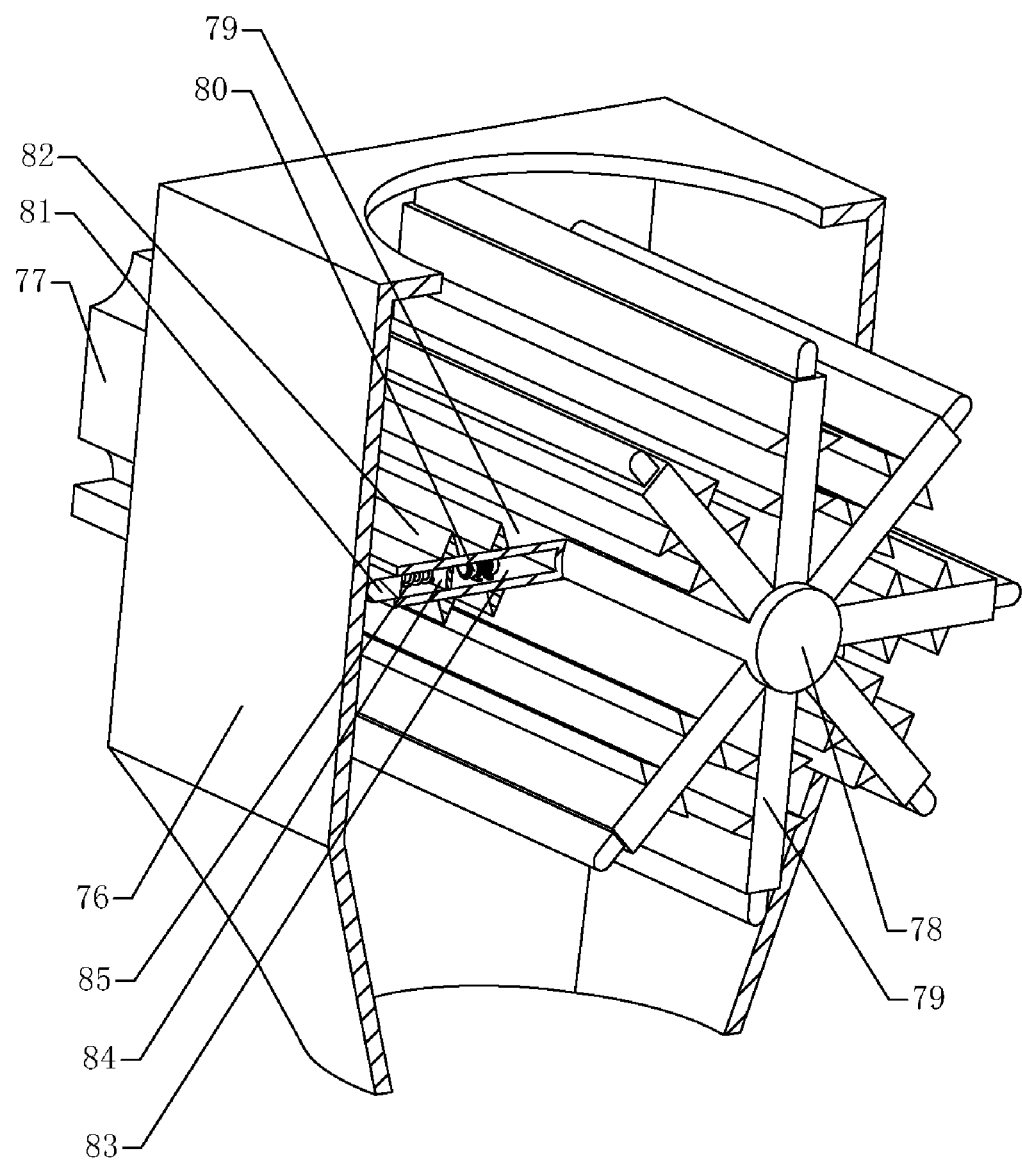
FIG. 10 is a structural diagram for indicating a cutting device according to Embodiment 2.

Referring to FIG. 9 and FIG. 10, this embodiment differs from the Embodiment 1 in that: a cutting device is provided between the hopper 75 and the conveying pipe 74. The cutting device includes a cutting box 76, a cutting motor 77 and a cutting assembly. An opening of the cutting box 76 is connected to the hopper 75. The bottom of the cutting box 76 is connected to the conveying pipe 74 and is communicated with the conveying pipe 74. The bottom of the cutting box is in a funnel shape. The cutting motor 77 is disposed in the cutting box 76. The cutting assembly is disposed inside the cutting box 76. The cutting assembly includes a cutting shaft 78, a cutting blade 79 and a vibration motor 80, an abutting plate 81 and a cutter 82. The cutting shaft is rotatably connected to the cutting box 76, and one end of the cutting shaft 78 penetrates the cutting box 76 and is connected to the cutting motor 77. There are eight cutting blades. The cutting blades 79 are connected to the cutting shaft and are distributed in an annular array about the centerline of the cutting shaft 78. A mounting groove 83 is provided on the end of the cutting blade 79 away from the cutting shaft 78. The vibration motor 80 is disposed in the mounting groove 83. A separation plate 84 is connected in the cutting blade 79. The separation plate 84 is positioned in the mounting groove 83. A first spring 85 is connected to the side of the separation plate 84 away from the vibration motor 80. The end of the first spring 85 away from the separation plate 84 abuts against the abutting plate 81. The side of the abutting plate 81 connecting to the first spring 85 is positioned in the mounting groove 83 and in a slidable connection with the mounting groove 83. The side of the abutting plate 81 away from the first spring 85 is designed as an arc chamfer. The abutting plate 81 abuts against the sidewall of the cutting box 76 facing the abutting plate 81 in a horizontal state. The cutters 82 are disposed on two opposite sides of the cutting blade 79, and the section od the cutter 82 is in a triangle shape.

The implement principle of Embodiment 2 in the present application is: when the dried feces fall from the hopper 75, it enters the cutting box 76. The cutting motor 77 drives the cutting shaft 78 to rotate during operation, and the cutting shaft 78 drives the cutting blade 79 to rotate. When the dried feces fall in the cutting box 76, the dried feces fall on the cutting blade 79, the vibration motor 80 vibrates the cutting blade 79 during operation, and the dried feces are cut by the cutter 82 on the cutting blade 79 continuously under vibration, so as to treat the dried feces more finely, which facilitates the further conveying of the dried feces.

The dried feces are delivered from the top of the cutting blade 79 to the bottom of the cutting blade 79 with the rotation of the cutting blade 79, and the dried feces are separated from the cutting blade 79 and fall into the conveying pipe 74 to be transported. In the rotation process of the cutting blade 79, when the cutting blade 79 rotates to a horizontal state, the abutting plate 81 in the cutting blade 79 may abut against the sidewall of the cutting box 76, which is facing the cutting blade 79, so as to make up the gap between the cutting blade 79 and the cutting box 76, and prevent the dried feces from falling into the conveying pipe 74 without being treated by the cutting mechanism.

What is claimed is:

1. An ultra-high temperature excrement solid-liquid separation extrusion sterilization integrated machine comprising a solid-liquid separator, and an extrusion sterilization device in communication with the solid-liquid separator;

wherein the extrusion sterilization device comprises an extrusion sterilization motor, an extrusion feeding assembly, a receiving pipe, a receiving box and a dehydrating cage;

a feed inlet is provided on one end of the receiving box, a feed outlet is provided on the other end, the dehydrating cage is disposed inside the receiving box, a diversion pipe is provided in the receiving box, one end of the receiving pipe is connected to the receiving box and is in communication with the feed inlet of the receiving box, and an outlet for solids of the solid-liquid separator is in communication with the receiving pipe;

the extrusion feeding assembly comprises an extruding shaft, a first conveying spiral blade, a spiral extruding blade, a spiral feeding plate and an extruding head;

the extruding shaft penetrates the receiving pipe, the receiving box and the dehydrating cage through the feed inlet and the feed outlet of the receiving box, an outer diameter of the extruding shaft is gradually increased, an end of the extruding shaft with a smaller outer diameter is rotatably connected to an end of the receiving pipe away from the receiving box, an end of the extruding shaft with a larger outer diameter penetrates the feed outlet of the receiving box, and the extrusion sterilization motor is in a transmission connection with the extruding shaft;

the first conveying spiral blade, the spiral extruding blade, and the spiral feeding plate are distributed on the extruding shaft along a length direction of the extruding shaft successively, the first conveying spiral blade is positioned inside the receiving pipe, an end of the first conveying spiral blade abuts to an end of the spiral extruding blade, the spiral feeding plate is disposed close to the feed outlet of the receiving box relative to the first conveying spiral blade, and a spiral angle of the spiral feeding plate is larger than a spiral angle of the spiral extruding blade; and the extruding head is connected on the extruding shaft and is positioned inside the feed outlet of the receiving box, an outlet channel is formed between the extruding head and the feed outlet of the receiving box, and the outlet channel inclines towards a direction departing from a centerline of the extruding shaft.

2. The ultra-high temperature excrement solid-liquid separation extrusion sterilization integrated machine according to claim 1, further comprising an excrement collection structure, the excrement collection structure comprises an excrement tank and a collection pipe, the collection pipe is disposed in the excrement tank, an outlet for liquids of the diversion pipe is connected to the collection pipe, an outlet for liquids of the solid-liquid separator is connected to a guide pipe, an outlet for liquids of the guide pipe is connected to the collection pipe.

3. The ultra-high temperature excrement solid-liquid separation extrusion sterilization integrated machine according to claim 2, further comprising a vacuum pump and a pulse negative pressure mechanism, the pulse negative pressure mechanism comprises a first exhaust pipe, a first storage tank, a first pulse pipe, and a first pulse valve; a chute and a sealing housing are provided in a workbench; an opening of the sealing housing is in communication with the chute, and the sealing housing is in communication with the feed outlet of the receiving box; one end of the first exhaust pipe is connected to the vacuum pump, and the other end of the first exhaust pipe is connected to the first storage tank; a first solenoid valve is provided in the first exhaust pipe; one end of the first pulse pipe is connected to the first storage tank, and the other end of the first pulse pipe is connected to the sealing housing and extends into an interior of the sealing housing; and the first pulse valve is disposed in the first pulse pipe.

4. The ultra-high temperature excrement solid-liquid separation extrusion sterilization integrated machine according to claim 3, further comprising a dry material treatment device; the dry material treatment device comprises a feed draught fan, a feeding pipe and a conveying pipe; an air outlet of the feed draught fan is connected to the feeding pipe, an end of a sidewall of the feeding pipe close to the feed draught fan is connected to the conveying pipe, an end of the conveying pipe away from the feeding pipe is in communication with the chute.

5. The ultra-high temperature excrement solid-liquid separation extrusion sterilization integrated machine according to claim 1, wherein a cut is provided in a portion of the spiral extruding blade close to the spiral feeding plate, a sidewall of the cut is disposed slantly, a slant direction is consistent with a spiral direction of the spiral extruding blade.

6. The ultra-high temperature excrement solid-liquid separation extrusion sterilization integrated machine according to claim 3, wherein a pumping device is provided in the solid-liquid separator, the pumping device comprises a pumping pipe, a sewage pump, an overflow pipe and a buffer box, the buffer box is disposed in the solid-liquid separator and is in communication with the feed inlet of the solid-liquid separator, the pumping pipe is disposed in the buffer box, the sewage pump is disposed in the pumping pipe, the overflow pipe is disposed on an end of the pumping pipe close to the buffer box, and an end of the overflow pipe away from the pumping pipe is connected to the collection pipe.

7. The ultra-high temperature excrement solid-liquid separation extrusion sterilization integrated machine according to claim 6, wherein a liquid level meter is provided on an end of an inner wall of the buffer box close to the pumping pipe, the liquid level meter is electrically connected to the sewage pump.

8. The ultra-high temperature excrement solid-liquid separation extrusion sterilization integrated machine according to claim 6, wherein a pulse anti-blockage mechanism is provided in the solid-liquid separator, the pulse anti-blockage mechanism comprises a second exhaust pipe, a second storage tank, a second pulse pipe and a second pulse valve; one end of the second exhaust pipe is connected to the vacuum pump, and the other end of the second exhaust pipe is connected to the second storage tank; a second solenoid valve is provided in the second exhaust pipe, one end of the second pulse pipe is connected to the second storage tank, and the other end of the second pulse pipe is connected to the solid-liquid separator and extends to an interior of the solid-liquid separator; an end of the second pulse valve extending into the solid-liquid separator is positioned outside a filtering cage, and the second pulse valve is disposed in the second pulse pipe.

9. The ultra-high temperature excrement solid-liquid separation extrusion sterilization integrated machine according to claim 1, wherein a pressing feeder machine is provided between the solid-liquid separator and the extrusion sterilization device; the pressing feeder machine comprises a pressing feeder box, a pressing feeder motor and a pressing feeder spiral assembly; an outlet end of the pressing feeder box is connected to the receiving pipe, the outlet for solids of the solid-liquid separator is connected to the pressing feeder box, the pressing feeder spiral assembly is disposed inside the pressing feeder box, the pressing feeder motor is disposed in the pressing feeder box and is in a drive connection with the pressing feeder spiral assembly.

10. The ultra-high temperature excrement solid-liquid separation extrusion sterilization integrated machine according to claim 9, wherein an opposite type sensor is provided on an end of an internal sidewall of the pressing feeder box close to the solid-liquid separator, the opposite type sensor is electrically connected to a solid-liquid separation motor of the solid-liquid separator.

\* \* \* \* \*